United States Patent
Dayton et al.

(10) Patent No.: US 12,405,037 B2
(45) Date of Patent: Sep. 2, 2025

(54) MAGNETIC FAILSAFE VALVE FOR CRYOGEN FLOW CONTROL

(71) Applicant: The Boeing Company, Arlington, VA (US)

(72) Inventors: Ian M. Dayton, Arlington, VA (US); Mark Edward Nowakowski, Arlington, VA (US)

(73) Assignee: The Boeing Company, Arlington, VA (US)

( * ) Notice: Subject to any disclaimer, the term of this patent is extended or adjusted under 35 U.S.C. 154(b) by 309 days.

(21) Appl. No.: 18/311,944

(22) Filed: May 4, 2023

(65) Prior Publication Data

US 2024/0369269 A1 Nov. 7, 2024

(51) Int. Cl.
*F25B 19/00* (2006.01)
*F25B 41/20* (2021.01)
*F16K 31/06* (2006.01)
*G01N 25/14* (2006.01)

(52) U.S. Cl.
CPC .......... *F25B 19/005* (2013.01); *F25B 41/20* (2021.01); *F16K 31/0644* (2013.01); *F16K 31/0679* (2013.01); *G01N 25/145* (2013.01)

(58) Field of Classification Search
CPC .......... F16K 31/0644; F16K 31/0679; F25B 19/005; F25B 41/20
See application file for complete search history.

(56) References Cited

U.S. PATENT DOCUMENTS

| | | | | |
|---|---|---|---|---|
| 5,996,369 A * | 12/1999 | Hirota | .................. | B60H 1/3204 251/118 |
| 7,080,666 B2 * | 7/2006 | Burger | .................. | F16K 27/041 137/341 |
| 8,434,523 B2 * | 5/2013 | Suharno | .............. | F15B 13/0817 137/884 |
| 8,729,894 B2 * | 5/2014 | Hollis | ................ | G01R 33/3815 324/307 |
| 9,165,704 B2 * | 10/2015 | Gore | .................. | G01R 33/3815 |
| 9,410,725 B2 * | 8/2016 | Mitsubori | ............. | F25D 19/006 |
| 10,748,690 B2 * | 8/2020 | Jonas | ........................ | H01F 6/04 |
| 10,876,433 B2 * | 12/2020 | Brett | ........................ | F01K 7/16 |
| 2002/0035836 A1 * | 3/2002 | Driehuys | ........... | G02F 1/133723 62/51.1 |
| 2009/0277517 A1 * | 11/2009 | Mann | ..................... | F25D 29/001 324/318 |

(Continued)

*Primary Examiner* — Filip Zec
(74) *Attorney, Agent, or Firm* — Harrity & Harrity, LLP (57) ABSTRACT

Examples relate to cryogen flow control techniques using a magnetic failsafe valve. The valve is located between a cryogen source and a cryogen bath and has a position based on the magnetic field generated by a parallel solenoid circuit having a superconducting solenoid wound in a first direction and a non-superconducting solenoid (e.g., normal metal solenoid) wound in a second direction. When the current source is supplying a current to the parallel solenoid circuit and the temperature at the parallel solenoid circuit is below a threshold temperature, the current flows through the superconducting solenoid causing the magnetic field generated by the parallel solenoid circuit to position the magnetic valve in a particular state (e.g., open). The position of the valve can quickly change in situations where the temperature rises above the threshold temperature.

20 Claims, 3 Drawing Sheets

(56) References Cited

U.S. PATENT DOCUMENTS

| | | | | |
|---|---|---|---|---|
| 2010/0148593 A1* | 6/2010 | Ohashi | ............... | H02K 55/02 |
| | | | | 335/216 |
| 2011/0056218 A1* | 3/2011 | Blakes | ............... | H01F 6/02 |
| | | | | 62/51.1 |
| 2011/0224641 A1* | 9/2011 | Brault | ............... | A61K 41/0004 |
| | | | | 600/410 |
| 2015/0027559 A1* | 1/2015 | Retz | ............... | G01R 33/288 |
| | | | | 137/68.19 |

* cited by examiner

CONTROL, BASED ON A POSITION OF A MAGNETIC VALVE, A FLOW OF LIQUID
CRYOGEN BETWEEN A CRYOGEN SOURCE AND A CRYOGEN BATH

MAGNETIC FAILSAFE VALVE FOR CRYOGEN FLOW CONTROL

FIELD

The present disclosure relates generally to cryogen flow control, and more particularly to, techniques for cryogen flow control using a magnetic failsafe valve.

BACKGROUND

Cryogenic testing is a process that involves exposing materials or components to extremely low temperatures in order to test their durability, performance, and other properties. It is commonly used in the aerospace, medical, and electronics industries, among others. For example, cryogenic testing may be used to test the thermal and mechanical properties of materials that will be used in space or in other extreme environments, or to test the reliability of electronic components that operate at very low temperatures. During cryogenic testing, materials or components are placed in a chamber or vessel and cooled to temperatures that can range from a few degrees above absolute zero (i.e., −273.15° Celsius or −459.67° Fahrenheit) to several hundred degrees below freezing. The materials or components are then subjected to various tests and measurements to determine their properties and performance under these extreme conditions.

In general, cryogenic testing can provide valuable insights into the behavior of materials and components in extreme environments, helping to improve the reliability and performance of products and technologies. The cryogenic substances used during testing, such as liquid nitrogen or helium, can be dangerous if not handled properly. Thus, it is critical to have safe practices and systems for a cryogenic testing environment.

SUMMARY

In one example, a system for controlling cryogen flow is described. The system includes a magnetic valve positioned between a cryogen source and a cryogen bath and a parallel solenoid circuit having a superconducting solenoid wound in a first direction and a non-superconducting solenoid wound in a second direction. The parallel solenoid circuit is coupled in parallel to a current source. In addition, the parallel solenoid circuit generates a magnetic field that controls a position of the magnetic valve based on a temperature at the parallel solenoid circuit and a supply of current from the current source.

In another example, a method for controlling cryogen flow is described. The method involves controlling, based on a position of a magnetic valve, a flow of liquid cryogen between a cryogen source and a cryogen bath. The magnetic valve is positioned between the cryogen source and the cryogen bath and the position of the magnetic valve depends on a magnetic field generated by a parallel solenoid circuit having a superconducting solenoid wound in a first direction and a non-superconducting solenoid wound in a second direction. The parallel solenoid circuit is coupled in parallel to a current source, and the parallel solenoid circuit generates the magnetic field that controls the position of the magnetic valve based on a temperature at the parallel solenoid circuit and a supply of current from the current source.

The features, functions, and advantages that have been discussed can be achieved independently in various examples or may be combined in yet other examples. Further details of the examples can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings.

DETAILED DESCRIPTION

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

Example embodiments relate to techniques and systems for controlling cryogen flow in cryogen testing environments by using a cryogen safety valve with its own, closed feedback loop. For instance, a system can implement a magnetic failsafe valve that automatically shuts off the cryogen flow from the supply to create a safer operating environment when a critical drop in cryogen cooling occurs. In some instances, disclosed techniques and systems can be implemented with an electronic flow control valve for active feedback and the current source can be configured to supply current to the system based on signals provided by a flow control monitor.

An example system for controlling cryogen flow includes a magnetic valve positioned between a cryogen source and a cryogen bath and a parallel solenoid circuit configured to control the position of the magnetic valve based on a current supply and a temperature at the circuit. In particular, the parallel solenoid circuit consists of a superconducting solenoid wound in a first direction and a non-superconducting solenoid wound in a second direction. In other words, the superconducting solenoid and the non-superconducting solenoid are wound in opposite directions with the superconducting solenoid positioned around the non-super conducting solenoid in some implementations. The parallel solenoid circuit is coupled in parallel to a current source and generates a magnetic field that controls a position of the magnetic valve based on a temperature at the parallel solenoid circuit and the supply of current supplied by the current source. In practice, the cryogen testing environment can include the cryogen source, the cryogen bath, and a channel that enables liquid cryogen to flow from the cryogen source into the cryogen bath and the magnetic valve can be positioned relative to the channel to enable the magnetic valve to control the liquid cryogen between the cryogen source and the cryogen bath or evacuation space.

The superconducting wire of one of the superconducting solenoids has a very low resistance (i.e., 0 Ohm resistance) when cooled below its critical temperature, described herein as the superconducting solenoid's threshold temperature. The other, non-superconducting solenoid is made from a standard conducting wire (e.g., copper), which has a higher resistance than the superconducting solenoid. When the parallel solenoid is charged with a current, the current will selectively flow into the path with the least resistance. Thus, when the parallel solenoid is cooled below the superconducting material's threshold temperature, the resistance of the superconducting solenoid is lower and the current will flow through the superconducting solenoid. This current path through the superconducting solenoid causes the parallel solenoid circuit to generate a magnetic field that can push or pull the magnetic valve open or close depending on the desired implementation.

When an event occurs in which the parallel solenoid circuit is warmed above the threshold temperature, such as in a rapid boil off or quenching event, the resistance of the superconducting solenoid will rise significantly above that of the normal conductor solenoid and the current will then reroute into the normal, counter-wound solenoid. This reroute of the current into the normal conductor solenoid can change the magnetic field produced by the parallel solenoid circuit, which may cause the magnetic valve to move in the opposite direction. For instance, the current flowing into the normal conductor solenoid may cause the magnetic field to pull or push the magnetic field in the opposite direction relative to when the current is flowing through the superconducting solenoid.

In some implementations, the system is arranged such that when the current source is supplying a current to the parallel solenoid circuit and the temperature at the parallel solenoid circuit is below a threshold temperature of the superconducting solenoid, the current flows through the superconducting solenoid resulting in the magnetic field generated by the parallel solenoid circuit to position the magnetic valve in an open state. Liquid cryogen can then flow from the cryogen source into the cryogen bath when the magnetic valve is positioned in the open state. In addition, when the current source is supplying the current to the parallel solenoid circuit and the temperature at the parallel solenoid circuit is above the threshold temperature, the current flows through the non-superconducting solenoid due to the increased resistance at the superconducting solenoid. The flow through the non-superconducting solenoid can cause the magnetic field generated by the parallel solenoid circuit to reposition the magnetic valve into a closed state, which prevents liquid cryogen from flowing into the cryogen bath from the cryogen source. For instance, if the cryogen testing environment experiences a rapid boil off or some other event that increases the temperature of the environment, the parallel solenoid circuit can quickly change its magnetic field in response to the temperature change and cause the magnetic valve to quickly change into a closed state that prevents further liquid cryogen from flowing into the cryogen bath.

In other implementations, the system is implemented such that when the current source is supplying a current to the parallel solenoid circuit and the temperature at the parallel solenoid circuit is below the threshold temperature associated with the resistance level of the superconducting solenoid material, the current flows through the superconducting solenoid thereby causing the magnetic field generated by the parallel solenoid circuit to position the magnetic valve in a closed state that prevents liquid cryogen from flowing into the cryogen bath or evacuation space from the cryogen source. As such, when the current source is supplying the current to the parallel solenoid circuit and the temperature at the parallel solenoid circuit is above the threshold temperature causing an increase in the resistance at the superconducting solenoid, the current flows through the non-superconducting solenoid and causes the magnetic field generated by the parallel solenoid circuit to position the magnetic valve in an open state to enable liquid cryogen flows from the cryogen source into the cryogen bath or evacuation space.

In some cases, the system includes a cryogenic cooling subsystem that cools the cryogen testing environment utilizing the parallel solenoid circuit and the magnetic valve. The cooling subsystem can cool the parallel solenoid circuit below the threshold temperature to keep the magnetic valve in a particular state unless an expected change in temperature occurs triggering the magnetic valve to change states. A computing system can provide control instructions to the cryogenic cooling subsystem, which can be used to adjust temperature applied to the cryogen testing environment. The system can also include a vacuum subsystem that can generate a vacuum space around an environment that includes the parallel solenoid circuit, magnetic valve, the cryogen source, and the cryogen bath. In some implementations, the system may also include a heat exchanger positioned proximate a portion of the superconducting solenoid. The heat exchanger can be used to adjust the temperature at the superconducting solenoid to influence the magnetic field controlling the position of the magnetic valve.

In additional implementations, the parallel solenoid circuit can be designed to partially open or partially close the flow channel by adjusting a position of the magnetic valve. For instance, the amount of current supplied to the parallel solenoid circuit can be adjusted to cause the parallel solenoid circuit to generate a magnetic field that positions the magnetic valve partially open or close thereby enabling a partial increase or decrease in the flow of liquid cryogen. In some cases, multiple failsafe systems can be implemented within a cryogenic testing environment. For instance, a failsafe system with multiple valves can offer a redundant configuration that can provide additional protection in cases where one of the failsafe systems experiences a malfunction. The multiple systems can be used to control flow in particular areas of the testing environment. The configuration of a multiple valve system can differ within implementations. For instance, parallel solenoid circuits associated with different magnetic valves can share the same current source or have different current sources within examples. Other types of valves can be used in addition to the magnetic valve in some cases, including electronically controllable valves and/or manual valves that can be adjusted by a technician. In addition, one or more magnetic valves can be used to direct cryogen flow in some cases, such as when multiple cryogen baths and/or evacuation spaces are part of the cryogen testing environment.

In some implementations, a magnetic failsafe system can further include an alert module that triggers one or more types of alerts based on the state of the magnetic valve. For instance, the alert module can trigger an audio, haptic, and/or audiovisual alert in response to detecting a change in the position of the magnetic valve from open to close or from close to open. The alert module may be able to communicate with remote devices, such as personal computing devices, a system controller, and remote displays. In some cases, the alert module can provide additional information, such as a temperature of the testing environment, a time measured since the magnetic valve last switched state, and/or other information. The alert module can leverage sensor measurements from various types of sensors, such as thermometers and flow sensors, etc. when providing information to technicians or users.

Figure 1:
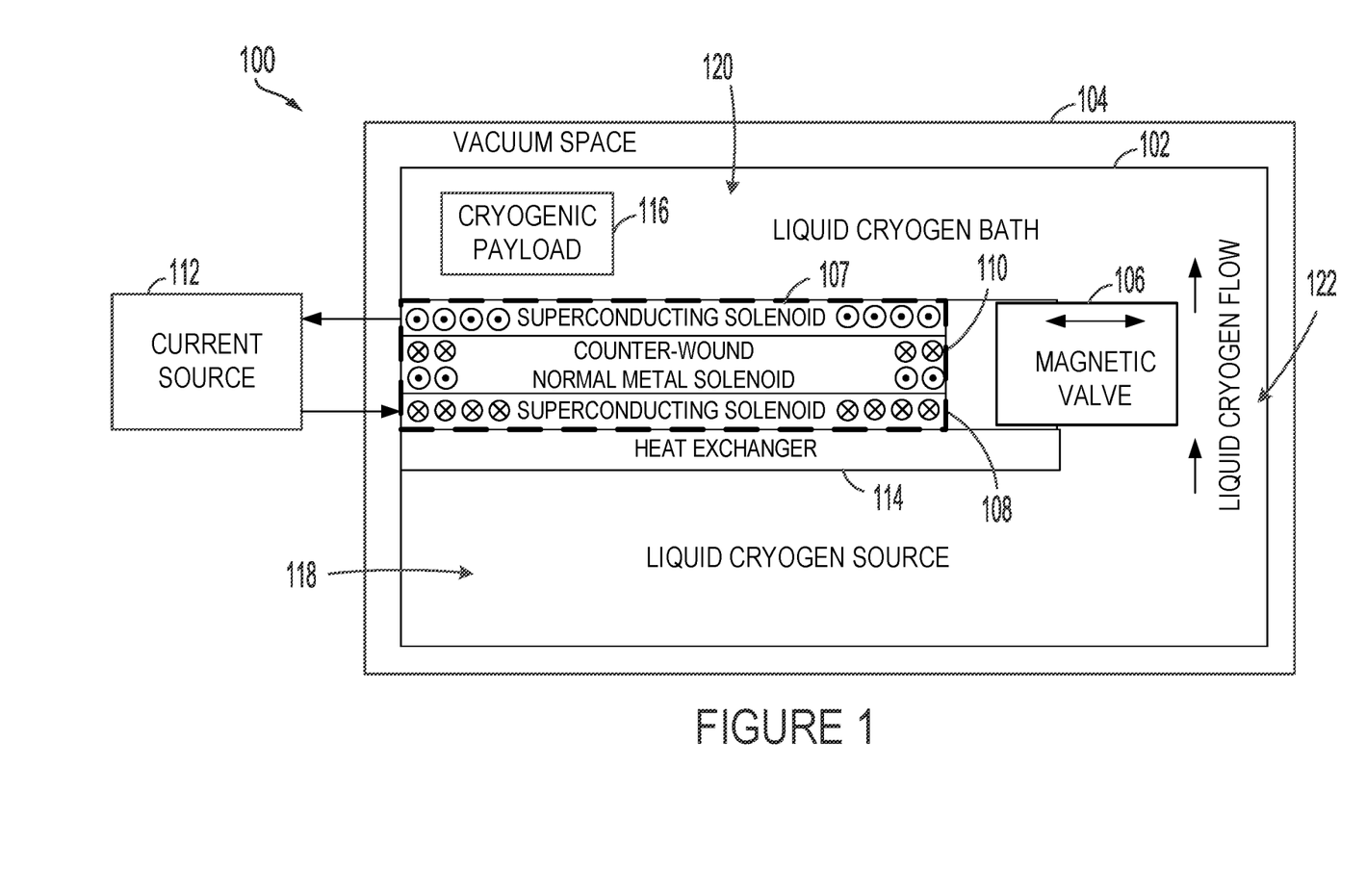
FIG. 1 illustrates a system for controlling cryogen flow, according to an example implementation.

Referring now to the figures, FIG. 1 illustrates a system 100 for cryogen testing, according to an example implementation. As shown in FIG. 1, the system 100 includes a cryogen environment 102 positioned within a vacuum space 104 for enabling cryogenic testing of a cryogenic payload 116. Within the cryogen environment 102, liquid cryogen flows from the cryogen source 118 and into the cryogen bath 120 via the channel 122 connecting the cryogen source 118 and the cryogen bath 120. The magnetic valve 106 is shown located relative to the channel 122 and positioned near a parallel solenoid circuit 107 that consists of a superconducting solenoid 108 wound in a first direction and a counter-wound normal metal solenoid 110 wound in a second direction opposite of the first direction. The system 100 also includes a current source 112 coupled in parallel to the parallel solenoid circuit 107, a heat exchanger positioned proximate a portion of the superconducting solenoid 108, and the cryogenic payload 116 located in the cryogen bath 120 of the cryogen environment 102. In other examples, the system 100 can include more or fewer components in other arrangements. For instance, the system 100 can include a control interface that includes an alert module in some implementations.

The cryogen environment 102, also referred to herein generally as a cryostat, enables testing the cryogenic payload 116 in very low temperatures. In the example shown in FIG. 1, the cryogen environment 102 comprises the cryogen source 118 configured to provide cryogenic fluids that flow through the channel 122 and into the cryogen bath 120 where the cryogenic payload 116 is located. Liquid nitrogen, helium, or cryogenic fluids are used to cool the cryogenic payload 116 to very low temperatures within the cryogen environment 102. The shape, size, and configuration of the cryogen environment 102 can vary within examples. For instance, the cryogen environment 102 can include multiple cryogen baths, cryogen sources, and/or channels in arrangements.

The vacuum space 104 can enable the cryogen environment 102 to achieve very low temperatures for testing. In practice, a vacuum is a space devoid of matter, particularly gas or air. As such, creating the vacuum space 104 may involve specialized equipment designed to remove or reduce the pressure of gas or air from the enclosed space. A vacuum system can include one or more pumps, valves, and chambers to create and maintain the vacuum space 104. In some instances, the vacuum space 104 can be produced by a vacuum-insulated vessel, jacket, or container that minimizes heat transfer from the surrounding environment and an inner container or insert that holds the fluid or gas for the cryogen environment 102.

The magnetic valve 106, also referred to as a solenoid valve, is part of an electromechanical device that is used to control the flow of cryogen liquids or gases through the channel 122 between the cryogen source 118 and the cryogen bath 120 in the cryogen environment 102. In particular, the magnetic valve 106 is positioned proximate the channel 122 to enable the magnetic valve 106 to block liquid or gas flow through the channel 122 when in a closed state and allow liquid or gas flow through the channel 122 when in an open state. The magnetic valve 106 can be made out of various materials that are compatible with the cryogenic fluid or gas that it is designed to control. For instance, the magnetic valve 106 can consist of brass, stainless steel, plastic, copper, and/or other materials. As such, the size, shape, material, and configuration of the magnetic valve 106 can vary within examples. In some instances, the size of the magnetic valve 106 is based on a length of the parallel solenoid circuit 107.

The parallel solenoid circuit 107 generates a magnetic field when receiving an electric current from the current source 112. The magnetic field is based on the temperature at the parallel solenoid circuit 107 since the current flow depends on the resistance levels of the opposite wound solenoids within the parallel solenoid circuit 107. The generated magnetic field can adjust or maintain a position of the magnetic valve 106, which opens or closes (or partially opens/closes) the channel 122 located between the cryogen source 118 and the cryogen bath 120 in the cryogen environment 102. For instance, the current flows through the superconducting solenoid thereby generating a magnetic field that influences a position of the magnetic valve 106 when the temperature of the cryogen environment 102 is below a threshold temperature that depends on the material of the superconducting material. In cases where the temperature of the cryogen environment 102 increases above the threshold temperature associated with the superconducting material, the current switches to flowing into the counter-wound normal metal solenoid 110, which changes the magnetic field and thus the position of the magnetic valve 106. For instance, the parallel solenoid circuit 107 may cease producing a magnetic field that is repelling (pushing) the magnetic valve into a closed state within the channel 122, which then results in the magnetic valve moving toward the parallel solenoid circuit 107 opening the channel 122 for liquid cryogen to flow from the cryogen source 118 into the cryogen bath 120. In some implementations, the parallel solenoid circuit 107 may produce a magnetic field with an opposite polarization upon the change in the temperature of the cryogen environment 102 above the threshold temperature associated with resistance level of the superconducting solenoid 108, which can be due to the opposite winding direction of the counter-wound normal metal solenoid 110.

Superconducting solenoid 108 is a solenoid that is made using superconducting wire and can conduct electricity with zero resistance when it is cooled to very low temperatures, i.e., below its threshold temperature as described herein. It can used to generate a strong, uniform magnetic field that holds the magnetic valve 106 in a particular state (e.g., open or closed). In general, a solenoid consists of a cylindrical coil of wire that is wound in a helical pattern around a hollow central core. When a current is passed through the coil, the coil generates a magnetic field that is directed along the axis of the solenoid and the magnetic field is proportional to the current flowing through the coil and the number of turns in the coil. The superconducting wire used in the superconducting solenoid 108 is cooled to very low temperatures using liquid nitrogen, helium, or other cryogenic fluid, which allows the wire to conduct electricity with zero resistance. This means that the superconducting solenoid 108 can generate very strong magnetic fields with very little energy loss, which makes it very efficient. The strength of the magnetic field generated by the superconducting solenoid 108 can be increased by increasing the number of turns in the coil, increasing the current flowing through the coil from the current source 112, or both. However, the amount of current that can be passed through the coil is limited by the critical current density of the superconducting wire, which represents the maximum current that the wire can carry without losing its superconductivity.

Counter-wound normal metal solenoid 110 is also a solenoid like superconducting solenoid 108, but it is made using a conventional metal wire that does not have superconducting properties, such as copper. As shown in FIG. 1, the counter-wound normal metal solenoid 110 is shown positioned inside the superconducting solenoid 108. Similar to the superconducting solenoid 108, when a current is passed through the counter-wound normal metal solenoid coil, the combination of the current and coil generates a magnetic field that is directed along the axis of the solenoid with the magnetic field is proportional to the current flowing through the coil and the number of turns in the coil. Unlike superconducting solenoids, the counter-wound normal metal solenoid 110 generates heat when current is passed through the coil due to resistance in the wire. This heat can limit the maximum amount of current that can be passed through the coil, which in turn limits the maximum magnetic field that can be generated by the counter-wound normal metal solenoid 110. As such, the strength of the magnetic field generated by the counter-wound normal metal solenoid 110 can be increased by increasing the number of turns in the coil, increasing the current flowing through the coil, or both, but may limited by the heat generated by the resistance of the wire. In some instances, the wire may eventually overheat and melt if the current is too high. The combination of the counter-wound normal metal solenoid 110 and the superconducting solenoid 108 allows for the position of the magnetic valve 106 to be controlled based on current supply and temperature.

The heat exchanger 114 is a device that can be used to transfer heat between a cryogenic fluid, such as liquid nitrogen or liquid helium, and another fluid, such as water or air. The purpose of the heat exchanger is to regulate the temperature of the cryogenic fluid and prevent it from boiling off too quickly or freezing. In some instances, the heat exchanger 114 consists of two separate fluid channels that are separated by a thin, thermally conductive barrier in some implementations. One channel contains the cryogenic fluid, while the other channel contains the fluid that needs to be cooled or heated. The two fluids flow in opposite directions, which allows for efficient heat transfer between the two fluids. For instance, as the cryogenic fluid flows through the heat exchanger 114, it absorbs heat from the other fluid, causing the cryogenic fluid to warm up and the other fluid to cool down. The amount of heat transferred depends on several factors, such as the flow rate of the fluids, the temperature difference between the fluids, and the surface area of the heat exchanger. In some cases, the heat exchanger 114 may be designed to cool the cryogenic fluid to temperatures below its boiling point, known as subcooling. This can help to reduce the rate of evaporation of the cryogenic fluid, which can be important in applications where the fluid needs to be stored for an extended period of time. In general, heat exchangers are commonly used in cryogenic testing applications, such as in thermal cycling chambers, where the temperature of the test sample needs to be rapidly cycled between extremely low and high temperatures. They are also used in cryogenic cooling systems for scientific experiments, such as in particle accelerators and telescopes.

The cryogenic payload 116 represents a device or set of devices that can operate at very low temperatures, such as below 150 degrees Celsius. For instance, the cryogenic payload 116 may include a variety of components, such as sensors, detectors, cameras, and other instruments, that are used to perform scientific experiments or gather data in a cryogenic environment. In general, cryogenic payloads are used in a variety of scientific and industrial applications, such as in astronomy, physics, and material science.

Figure 2:
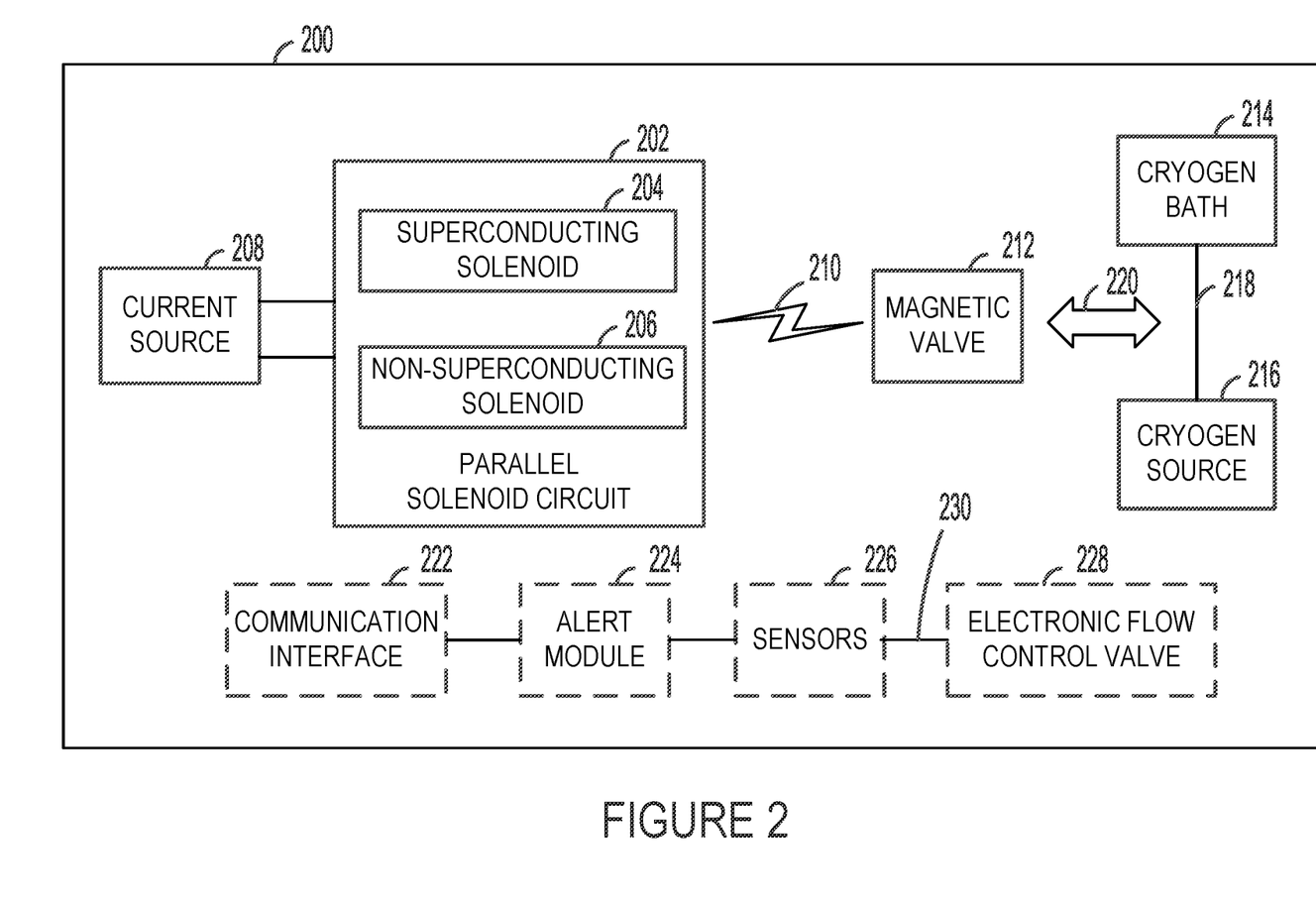
FIG. 2 is a simplified block diagram of another system for controlling cryogen flow, according to an example implementation.

FIG. 2 is a simplified block diagram of a system 200 for controlling cryogen flow, according to an example implementation. Similar to the system 100 shown in FIG. 1, the system 200 includes a parallel solenoid circuit 202 that consists of a superconducting solenoid 204 and a non-superconducting solenoid 206, which are wound in opposite directions. For instance, the superconducting solenoid 204 can be wound in a first direction and the non-superconducting solenoid 206 can be wound in a second, opposite direction. The system 200 also includes a current source 208 coupled in parallel to the parallel solenoid circuit 202, which receives electrical current from the current source 208 and generates a magnetic field 210 that impacts the position of the magnetic valve 212 as represented by bidirectional arrow 220.

As further shown, the position of the magnetic valve 212 impacts the flow of liquid cryogen through the channel 218 between the cryogen bath 214 and the cryogen source 216. In particular, depending on the magnetic field 210 generated by the parallel solenoid circuit 202, the magnetic valve 212 can be positioned in a closed state that blocks the flow through the channel 218, in an open state that allows the flow through the channel 218, or in a partially open state. The magnetic field 210 produced by the parallel solenoid circuit 202 can depend on the temperature at the parallel solenoid circuit 202 and the electric current being supplied by the current source 208.

In addition, the system 200 may further include additional components in some example implementations, such as the communication interface 222, the alert module 224, one or more sensors 226, and/or the electronic flow control valve 228. These components are shown coupled together via a connection mechanism 230, which can represent any type of wired or wireless connection link.

Communication interface 222 allows communication between two or more systems, devices, or entities, and may enable information, data, and/or signals to be exchanged between the system 200 and a computing system used by a user.

The alert module 224 a component or subsystem of the system 200 that is designed to generate and deliver notifications or alerts to notify users or administrators about specific events or conditions occurring during cryogenic testing. In general, the alert module 224 can use one or more sensors 226 to monitor and detects events or conditions that trigger alerts. These events could be predefined events or conditions that are configured within the system 200, such as system failures, abnormal conditions, or threshold violations associated with the cryogenic testing. Once an event or condition is detected, the alert module generates an alert based on predefined rules or settings. The alert may contain information about the event, its severity, location, and other relevant details. The alert module 224 determines the appropriate recipients for the alert and routes it to the designated recipients, which could be administrators, users, or other stakeholders who need to be notified about the event or condition. The alert module 224 delivers the generated alert to the designated recipients through various communication channels, such as email, SMS, push notifications, or other means, depending on the system's capabilities and configurations. The alert module 224 may also provide functionalities for managing alerts, such as tracking and logging alerts, prioritizing alerts, escalating alerts, and resolving alerts once the underlying event or condition is addressed.

Sensors 226 can include one or more types of sensors that are useful for maintaining and monitoring a cryogen testing environment. In a cryogen testing environment where materials or systems are exposed to extremely low temperatures, various types of sensors 226 can be used to measure different parameters and provide critical information about the performance and behavior of the materials or systems. For instance, sensors 226 can include temperature sensors that are designed to accurately measure temperatures in the cryogenic range (e.g., below −150° C. (−238° F.)). The temperature sensors can use different technologies, such as platinum resistance temperature detectors (RTDs), thermocouples, or semiconductor-based sensors that are specifically calibrated and designed for operation in cryogenic conditions. Sensors 226 can also include pressure sensors that measure the pressure of cryogenic liquids or gases in the cryogen testing environment. The pressure sensors can be based on different principles, such as piezoresistive, capacitive, or vibrating element technologies, and are capable of operating at low temperatures to provide accurate pressure measurements.

In some implementations, sensors 226 can include strain sensors, which are used to measure the strain or deformation of materials or structures in the cryogen testing environment. The strain sensors can be based on different technologies, such as foil strain gauges, semiconductor strain gauges, or fiber optic sensors, which are specifically designed for cryogenic conditions and can provide precise measurements of strain or deformation. Similarly, sensors 226 can also include level sensors that can measure the level or volume of cryogenic liquids in tanks or containers. Example level sensors can use capacitance, ultrasonic, or radar technologies, to provide accurate level measurements in cryogenic conditions, where the properties of materials may change significantly due to low temperatures. Sensors 226 may also include flow sensors that can measure the flow rate of cryogenic liquids or gases in pipes or systems and/or gas sensors that are used to measure the concentration of gases in a cryogen testing environment, such as oxygen, nitrogen, helium, or other gases that may be used or released during cryogenic processes. In addition, sensors 226 can also include cryogenic liquid level detectors, which can be used to detect the presence or absence of cryogenic liquids in tanks or containers.

Electronic flow control valve 228 can represent one or more valves that enable precise control over the flow rate of liquid cryogen through the channel 218 when the magnetic valve 212 is in an open (or partially open) state. As such, the electronic flow control valve 228 allows for fine adjustments to be made based on system requirements or operational conditions associated with the system 200. Electronic flow control valves can exist in various designs, such as glove valves, ball valves, butterfly valves, and others. In addition, electronic flow control valve 228 can be actuated by various means, including electric motors, solenoids, or piezoelectric actuators, and can be controlled using a variety of electronic signals, such as analog or digital signals, depending on the design and functionality of the valve. Electronic flow control valve 228 can be controlled remotely, integrated into automated systems, and are often capable of providing feedback on their status and performance.

Figure 3:
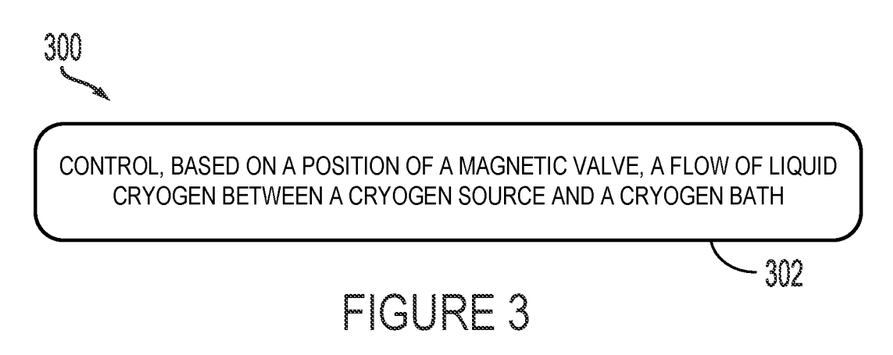
FIG. 3 illustrates a flowchart of an example method for controlling cryogen flow, according to an example implementation.

FIG. 3 illustrates a flowchart of an example of a method for controlling cryogen flow, according to an example implementation. Method 300 shown in FIG. 3 presents an example of a method that could be used with the system shown in FIGS. 1 and 2 or with components of thereof. Further, the functions described with respect to FIG. 3 may be supplemented by, replaced by, or combined with functions and features described herein.

At block 302, method 300 involves controlling, based on a position of a magnetic valve, a flow of liquid cryogen between a cryogen source and a cryogen bath. In particular, the magnetic valve can be positioned between the cryogen source and the cryogen bath and the position of the magnetic valve depends on a magnetic field generated by a parallel solenoid circuit having a superconducting solenoid wound in a first direction and a non-superconducting solenoid wound in a second direction. The parallel solenoid circuit is coupled in parallel to a current source and generates the magnetic field that controls the position of the magnetic valve based on a temperature at the parallel solenoid circuit and a supply of current from the current source.

In some examples, method 300 further involves maintaining the temperature at the parallel solenoid circuit below a threshold temperature and supplying current to the parallel solenoid circuit. In particular, the parallel solenoid circuit can generate the magnetic field that positions the magnetic valve in an open state when the current source is supplying current to the parallel solenoid circuit and the temperature at the parallel solenoid circuit is below the threshold temperature, thereby enabling liquid cryogen to flow from the cryogen source into the cryogen bath.

In some examples, method 300 additionally involves cooling, by a cryogenic cooling system, an environment having the parallel solenoid circuit and the magnetic valve below the threshold temperature.

In some examples, method 300 involves increasing the temperature at the parallel solenoid circuit above a threshold temperature, which may cause the parallel solenoid circuit to generate the magnetic field that positions the magnetic valve in a closed state. In particular, when the current source is supplying current to the parallel solenoid circuit and the temperature at the parallel solenoid circuit is above the threshold temperature, the magnetic valve may be positioned by the parallel solenoid circuit to block liquid cryogen from flowing into the cryogen bath from the cryogen source.

By the term "substantially" and "about" used herein, it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Different examples of the system(s), device(s), and method(s) disclosed herein include a variety of components, features, and functionalities. It should be understood that the various examples of the system(s), device(s), and method(s) disclosed herein may include any of the components, features, and functionalities of any of the other examples of the system(s), device(s), and method(s) disclosed herein in any combination or any sub-combination, and all of such possibilities are intended to be within the scope of the disclosure.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to explain the principles of the examples, the practical application, and to enable others of ordinary skill in the art to understand the disclosure for various examples with various modifications as are suited to the particular use contemplated.

What is claimed is:

1. A system for controlling cryogen flow comprising:
a magnetic valve positioned between a cryogen source and a cryogen bath; and
a parallel solenoid circuit having a superconducting solenoid wound in a first direction and a non-superconducting solenoid wound in a second direction,
wherein the parallel solenoid circuit is coupled in parallel to a current source, and
wherein the parallel solenoid circuit generates a magnetic field that controls a position of the magnetic valve based on a temperature at the parallel solenoid circuit and a supply of current from the current source.

2. The system of claim 1, wherein when the current source is supplying a current to the parallel solenoid circuit and the temperature at the parallel solenoid circuit is below a threshold temperature, the current flows through the superconducting solenoid causing the magnetic field generated by the parallel solenoid circuit to position the magnetic valve in an open state, and
wherein liquid cryogen flows from the cryogen source into the cryogen bath when the magnetic valve is positioned in the open state.

3. The system of claim 2, wherein when the current source is supplying the current to the parallel solenoid circuit and the temperature at the parallel solenoid circuit is above the threshold temperature, the current flows through the non-superconducting solenoid causing the magnetic field generated by the parallel solenoid circuit to position the magnetic valve in a closed state, and
wherein the magnetic valve prevents liquid cryogen from flowing into the cryogen bath from the cryogen source when the magnetic valve is positioned in the closed state.

4. The system of claim 1, wherein when the current source is supplying a current to the parallel solenoid circuit and the temperature at the parallel solenoid circuit is below a threshold temperature, the current flows through the superconducting solenoid causing the magnetic field generated by the parallel solenoid circuit to position the magnetic valve in a closed state, and
wherein the magnetic valve prevents liquid cryogen from flowing into the cryogen bath from the cryogen source when the magnetic valve is positioned in the closed state.

5. The system of claim 4, wherein when the current source is supplying the current to the parallel solenoid circuit and the temperature at the parallel solenoid circuit is above the threshold temperature, the current flows through the non-superconducting solenoid causing the magnetic field generated by the parallel solenoid circuit to position the magnetic valve in an open state, and
wherein liquid cryogen flows from the cryogen source into the cryogen bath when the magnetic valve is positioned in the open state.

6. The system of claim 4, wherein the threshold temperature depends on a material of the superconducting solenoid.

7. The system of claim 1, further comprising:
a cryogenic cooling subsystem configured to cool an environment having the parallel solenoid circuit and the magnetic valve below a threshold temperature.

8. The system of claim 1, wherein the superconducting solenoid is positioned around the non-superconducting solenoid.

9. The system of claim 1, further comprising:
the cryogen source;
the cryogen bath; and
a channel connecting the cryogen source and the cryogen bath, wherein the magnetic valve is located proximate the channel.

10. The system of claim 9, wherein when the magnetic valve closes the channel when the magnetic valve is positioned in a closed state.

11. The system of claim 1, further comprising:
a vacuum subsystem configured to generate a vacuum space around an environment that includes the parallel solenoid circuit, magnetic valve, the cryogen source, and the cryogen bath.

12. The system of claim 1, further comprising:
a heat exchanger positioned proximate a portion of the superconducting solenoid, wherein the heat exchange is configured to adjust the temperature at the superconducting solenoid.

13. The system of claim 1, wherein a size of the magnetic valve is based on a length of the parallel solenoid circuit.

14. The system of claim 1, further comprising:
a second parallel solenoid circuit, wherein the second parallel solenoid circuit is coupled in parallel to the current source; and
a second magnetic valve, wherein a position of the second magnetic valve depends on a temperature at the second parallel solenoid circuit and a current supply at the second parallel solenoid circuit.

15. The system of claim 1, further comprising:
an alert module, wherein the alert module is configured to provide an alert upon detecting a change in the position of the magnetic valve.

16. The system of claim 1, further comprising:
a flow control monitor, wherein the current source is configured to supply current based on one or more signals provided by the flow control monitor.

17. A method for controlling cryogen flow comprising:
controlling, based on a position of a magnetic valve, a flow of liquid cryogen between a cryogen source and a cryogen bath,
wherein the magnetic valve is positioned between the cryogen source and the cryogen bath,
wherein the position of the magnetic valve depends on a magnetic field generated by a parallel solenoid circuit having a superconducting solenoid wound in a first direction and a non-superconducting solenoid wound in a second direction,
wherein the parallel solenoid circuit is coupled in parallel to a current source,
wherein the parallel solenoid circuit generates the magnetic field that controls the position of the magnetic valve based on a temperature at the parallel solenoid circuit and a supply of current from the current source.

18. The method of claim 17, further comprising:
maintaining the temperature at the parallel solenoid circuit below a threshold temperature; and
supplying current to the parallel solenoid circuit, wherein the parallel solenoid circuit generates the magnetic field that positions the magnetic valve in an open state when the current source is supplying current to the parallel solenoid circuit and the temperature at the parallel solenoid circuit is below the threshold temperature, and
wherein liquid cryogen flows from the cryogen source into the cryogen bath when the magnetic valve is positioned in the open state.

19. The method of claim 18, further comprising:
cooling, by a cryogenic cooling system, an environment having the parallel solenoid circuit and the magnetic valve below the threshold temperature.

20. The method of claim 17, further comprising:
increasing the temperature at the parallel solenoid circuit above a threshold temperature,
wherein the parallel solenoid circuit generates the magnetic field that positions the magnetic valve in a closed state when the current source is supplying current to the parallel solenoid circuit and the temperature at the parallel solenoid circuit is above the threshold temperature, and wherein the magnetic valve blocks liquid cryogen from flowing into the cryogen bath from the cryogen source when the magnetic valve is in the closed state.

* * * * *